United States Patent [19]
Bachhuber

[11] Patent Number: 5,891,277
[45] Date of Patent: Apr. 6, 1999

[54] AUTOMOTIVE TIRE INFLATION SYSTEM

[76] Inventor: Anthony A. Bachhuber, 1019 Hazel St., Oshkosh, Wis. 54901

[21] Appl. No.: 815,446

[22] Filed: Mar. 11, 1997

Related U.S. Application Data

[63] Continuation-in-part of Ser. No. 298,253, Aug. 30, 1994, Pat. No. 5,611,875.

[51] Int. Cl.$^6$ .................................................. B60C 23/00
[52] U.S. Cl. ........................... 152/415; 141/95; 141/197; 701/29; 701/32
[58] Field of Search ..................................... 152/415, 416, 152/417; 141/1, 4, 94, 95, 197, 38; 701/29, 32

[56] References Cited

U.S. PATENT DOCUMENTS

| | | | |
|---|---|---|---|
| 4,452,371 | 6/1984 | Jurek ........................................ | 220/315 |
| 4,582,108 | 4/1986 | Markow et al. ......................... | 152/418 |
| 4,614,479 | 9/1986 | Liu .......................................... | 417/44.6 |
| 4,641,698 | 2/1987 | Bitonti .................................... | 152/416 |
| 4,763,709 | 8/1988 | Scholer ................................... | 152/416 |
| 4,782,878 | 11/1988 | Mittal ...................................... | 152/417 |
| 4,840,212 | 6/1989 | Wei ......................................... | 152/419 |
| 4,872,492 | 10/1989 | McAnally et al. ........................ | 141/38 |
| 4,875,509 | 10/1989 | DaSilva ................................... | 141/38 |
| 4,883,107 | 11/1989 | Keys ....................................... | 152/431 |
| 5,104,295 | 4/1992 | Wong ..................................... | 417/44.6 |
| 5,158,122 | 10/1992 | Moffett ................................... | 141/38 |
| 5,244,027 | 9/1993 | Freigang ................................ | 152/416 |
| 5,253,687 | 10/1993 | Beverly et al. ......................... | 152/416 |
| 5,307,846 | 5/1994 | Heinemann ............................. | 141/1 |
| 5,429,166 | 7/1995 | Anzai et al. ............................ | 152/415 |

*Primary Examiner*—Francis J. Lorin
*Attorney, Agent, or Firm*—Quarles & Brady

[57] ABSTRACT

A computer based system for adjusting the pressure in pneumatic tires prompts the operator for pressure and vehicle type information. Comparison of vehicle type with predetermined pressure ranges is used to detect erroneously entered pressure values. A remote pressure sensor is used together with a intermittent inflation/deflation schedule to permit equalization of the hose and tire pressure without metering valves. The sampling rate of pressure in the schedule is based on total tire volume input by the user or deduced from the inflation rate.

12 Claims, 6 Drawing Sheets

AUTOMOTIVE TIRE INFLATION SYSTEM

CROSS-REFERENCE TO RELATED APPLICATION

This application is a continuation-in-part of U.S. application Ser. No. 08/298,253 filed on Aug. 30, 1994, U.S. Pat. No. 5,611,875.

STATEMENT REGARDING FEDERALLY SPONSORED RESEARCH OR DEVELOPMENT

BACKGROUND OF THE INVENTION

The present invention relates to systems for inflating pneumatic tires and, in particular, to a system for automatically inflating a pneumatic tire to a pre-selected pressure.

Tire pressure critically affects how long a pneumatic tire lasts and the fuel economy and handling characteristics of the vehicle on which the tires are mounted. Tire pressure may change over time as a result of fluctuations in air temperature and through small leaks between the rim and hub of the tire or through the tire's valve. For this reason, tire pressure should be checked periodically and corrected either by inflation or deflation as may be necessary.

It is convenient to check tire pressure at the time the vehicle is being serviced or fueled. Service stations often have a source of compressed air for operating pneumatic tools and tires may be inflated using a hose from this source having the proper chuck for connecting to the tire's valve stem. Using such an unregulated source of air pressure, the tire pressure is corrected on a trial and error basis by inflating (or deflating) the tire and frequently removing the chuck from the valve stem to check progress with a hand-held pressure gauge.

This method requires some skill and an accurate hand pressure gauge and thus may require the assistance of service station personnel, distracting them from their other duties. To the extent that the use of the hand gauge encourages a person to be close to the inflating tire, the risk of injury from an exploding tire is increased.

Automated inflation devices are known which inflate a tire under the control of a mechanical or electrical pressure switch. Such devices that have found their way into common usage have proven to be inaccurate and have fallen into disfavor.

The difficulty of providing a low cost automatic inflation device arises from the high cost of rugged and accurate pressure metering devices, lack of knowledge by the automotive public as to the proper operation of such devices, and the significant problems of safety and reliability of a mechanism operating largely unattended by inexperienced individuals.

BRIEF SUMMARY OF THE INVENTION

The present invention provides an inexpensive inflation system suitable for use in service stations and the like by inexperienced members of the public. Inflation pressure is selected by a method in which the vehicle type, total tire volume and tire pressure are entered and compared to detect errors in pressure entered before the inflation process may start. The desired pressure and current pressure are displayed continuously to the user to provide an indication of proper inflation occurring.

An accurate electronic pressure sensor is removed from the damaging shock experienced by the hose, and placed in the protective housing of the inflation unit. The imperfect coupling between the pressure measured by this remote sensor and the actual tire pressure is accommodated by a timed inflation/deflation schedule which allows settling pauses between episodes of inflation/deflation, permitting the pressures to stabilize either during inflation or deflation.

Common failures of the valves, the pressure sensor, tire or slipping off of the inflation chuck are detected by tracking the historical progress of the inflation/deflation cycle. Too many inflation/deflation cycles with insufficient total or incremental change in pressure are used to detect the failure of one or more of these components.

Specifically, the invention provides an air flow valve connected to a source of pressurized air to permit the flow of air from that source into a pneumatic tire when the valve is opened and to prevent the flow of air from the source to the pneumatic tire when the valve is closed. A data entry terminal permits the entry of a desired inflation pressure for the pneumatic tire and a vehicle type for the vehicle. An electronic computer receives data from the data entry terminal and reads the desired inflation pressure, total tire volume and vehicle type from the entry terminal. The desired inflation pressure is compared with a stored range of inflation pressures for the vehicle type. The valve is opened only if the desired inflation pressure is within the stored range of inflation pressures.

The data entry device may be a keyboard with only a limited number of keys for a limited number of vehicle types, number of tires to inflate and inflation pressures. An error message may be displayed if the vehicle type is inconsistent with the inflation pressure.

Thus, it is one object of the invention to reduce the chance that an erroneously high pressure will be entered by an inexperienced user resulting in incorrect tire inflation.

The current pressure and the desired pressure may be displayed in real-time on the display so that the inflation process may be monitored.

Thus it is another object of the invention to encourage the consumer's monitoring of the inflation from a remote location from the tire so that possible unanticipated failures may be detected and corrected with reduced risk.

The electronic computer in inflating or deflating a tire may open either an inflation or deflation air flow valve for a first calculated time interval and close that air valve for a second calculated time interval after which tire pressure may be read by a remotely located pressure transducer. The second calculated time interval is to permit the equalization of air pressure between the tire and the pressure transducer. These previous steps are repeated if the desired pressure has not been reached.

It is thus another object of the invention to permit the use of a high accuracy pressure transducer located remotely from the tire and thus shielded from damage and shock. Generally, the pressure on the "hose side" of an inflation system will differ markedly from the pressure within the tire as a result of the pressure difference across the tire valve and the effective resistance of the connecting hose. The present invention avoids the need for reduced air flow and trouble prone metering valves by using a set of repeated pressurize-, wait- and measurement-steps which permit hose pressure to equalize and better reflect internal tire pressure.

The hose pressure may be read at a first time and a number of repetitions of the inflation or deflation steps may be counted. The hose pressure may be read a second time and the magnitude of the change in pressure between the first and second times calculated. Inflation or deflation is ceased if the number of repetitions exceeds a predetermined count and the magnitude of the change in pressure is inside of a predetermined pressure range.

Thus it is another object of the invention to provide a means for detecting possible failures in the components of the pressurization system or incorrect use. For example, if the chuck is not attached to the tire or if the pressure transducers or valves have failed, a low rate of change of pressure will be detected and the inflation or deflation cycle may be ceased.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE INVENTION

Inflation System Hardware

Figure 1:
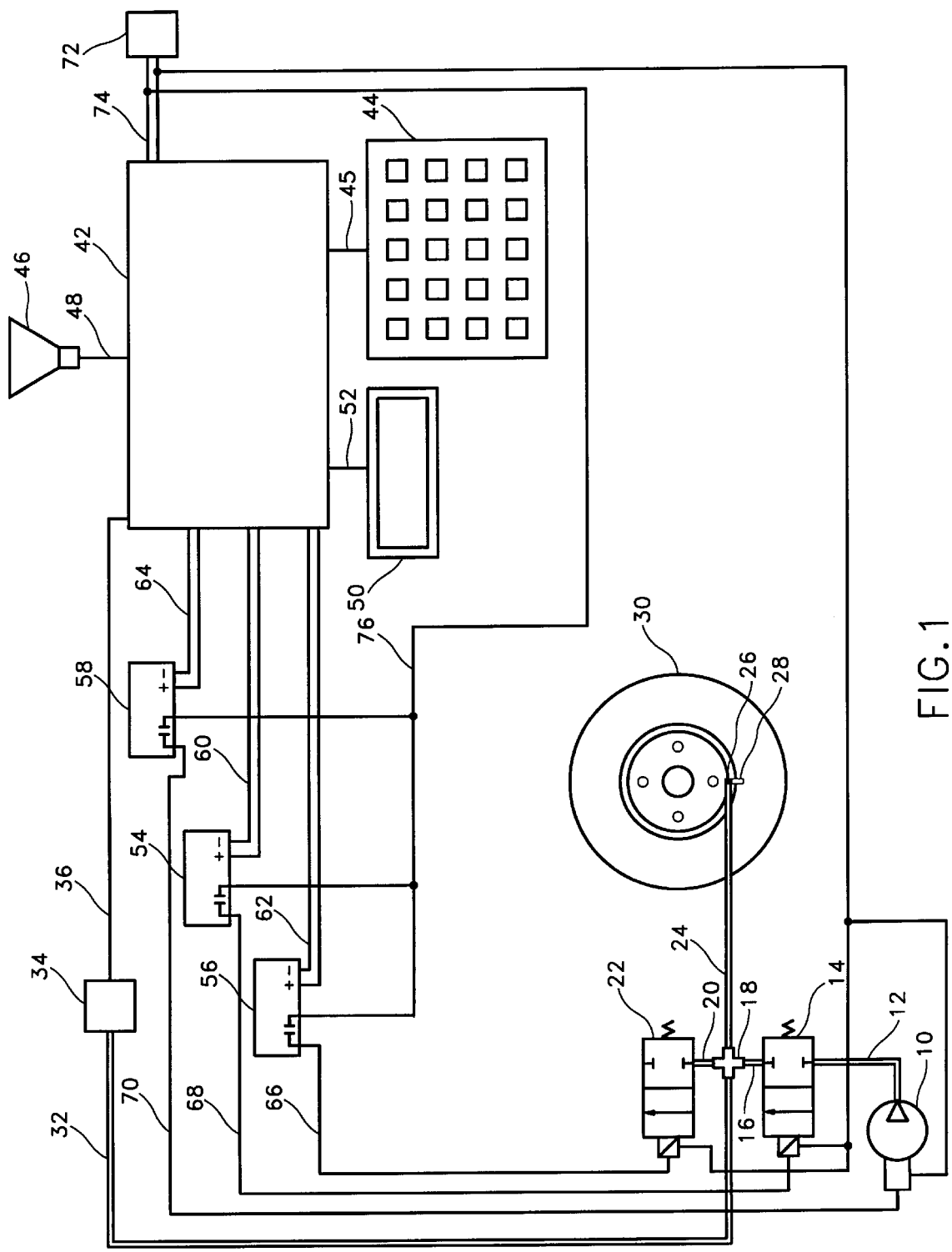
FIG. 1 is a schematic representation of the inflation system of the present invention showing a computer with a keyboard for entering inflation information and a display for displaying tire pressure.

With reference to FIG. 1, the system includes a source of pressurized air such as an air compressor 10, which is connected by conduit 12 to the input side of an inflation valve 14. The inflation valve 14 is preferably a normally closed solenoid valve which opens when actuated by an appropriate electrical signal and pilot pressure. The outlet side of the inflation valve 14 is connected by a conduit 16 to a junction 18. The opposite side of junction 18 is connected by conduit 20 to the inlet side of deflation valve 22 which is also preferably a normally closed solenoid valve. The deflation valve 22 is actuated by the appropriate electrical signals and pilot pressure.

Junction 18 is also connected by conduit 24 to locking tire chuck 26 which in turn is connected to tire valve 28 of tire 30. The locking tire chuck is commonly known and commercially available and is not shown in detail. Junction 18 is also connected by conduit 32 to pressure transducer 34.

Deflation valve 22 has its inlet side fluidly connected to conduit 20 while its outlet side is open to the atmosphere. Thus, upon actuation, deflation valve 22 exhausts air from the tire 30 and thus reduces the tire pressure.

Inflation valve 14 has its inlet side fluidly connected to air compressor 10 by conduit 12 while its outlet side is connected to the tire 30 by means of junction 18, conduit 24, locking tire chuck 26, and tire valve 28. Thus, upon actuation, inflation valve 14 supplies air to the tire 30 and thus increases the tire pressure.

Still referring to FIG. 1, a pressure transducer 34 is connected to and measures the pressure within the tire 30 by means of conduit 32, junction 18, conduit 24, locking tire chuck 26, and tire valve 28. Pressure transducer 34 generates an electrical output signal 36 which is representative of the pressure within the tire 30.

Keypad 44 is connected by electrical connection 45 to the computer 42. The keypad 44 provides the operator the means to communicate information to the computer 42 for system operation.

Still referring to FIG. 1, an alarm 46 is connected to the computer 42 by way of electrical connection 48. The computer 42 actuates or 'beeps' the alarm 46 when the tire 30 is set to the right pressure and when the system malfunctions or the operator enters the wrong key sequence.

A display device 50, preferably a liquid crystal display (LCD) is connected to the computer 42 by electrical means 52. The computer 42 prompts the operator by way of the LCD 50 to enter a specific key sequence by way of the keypad 44.

Still referring to FIG. 1, solid state relays 54, 56, and 58 are connected to the computer 42 by way of electrical connections 60, 62, and 64, respectively. The solid state relays turn on their respective devices by way of electrical connections 66, 68, and 70. The computer 42 controls the actuation of the inflation valve 14, deflation valve 22, and air compressor 10 by energizing the solid state relays 54, 56, and 58 by means of electrical connections 60, 62, and 64.

Still referring to FIG. 1, power supply 72 supplies power to the computer 42 by way of electrical connection 74 and also supplies power for the outputs of the solid state relays 54, 56, 58 by means of electrical connection 76.

The computer 42 can comprise, for example, a hardwired logic circuit, programmable logic circuit, microprocessor controlled circuit, or the like.

Figure 2:
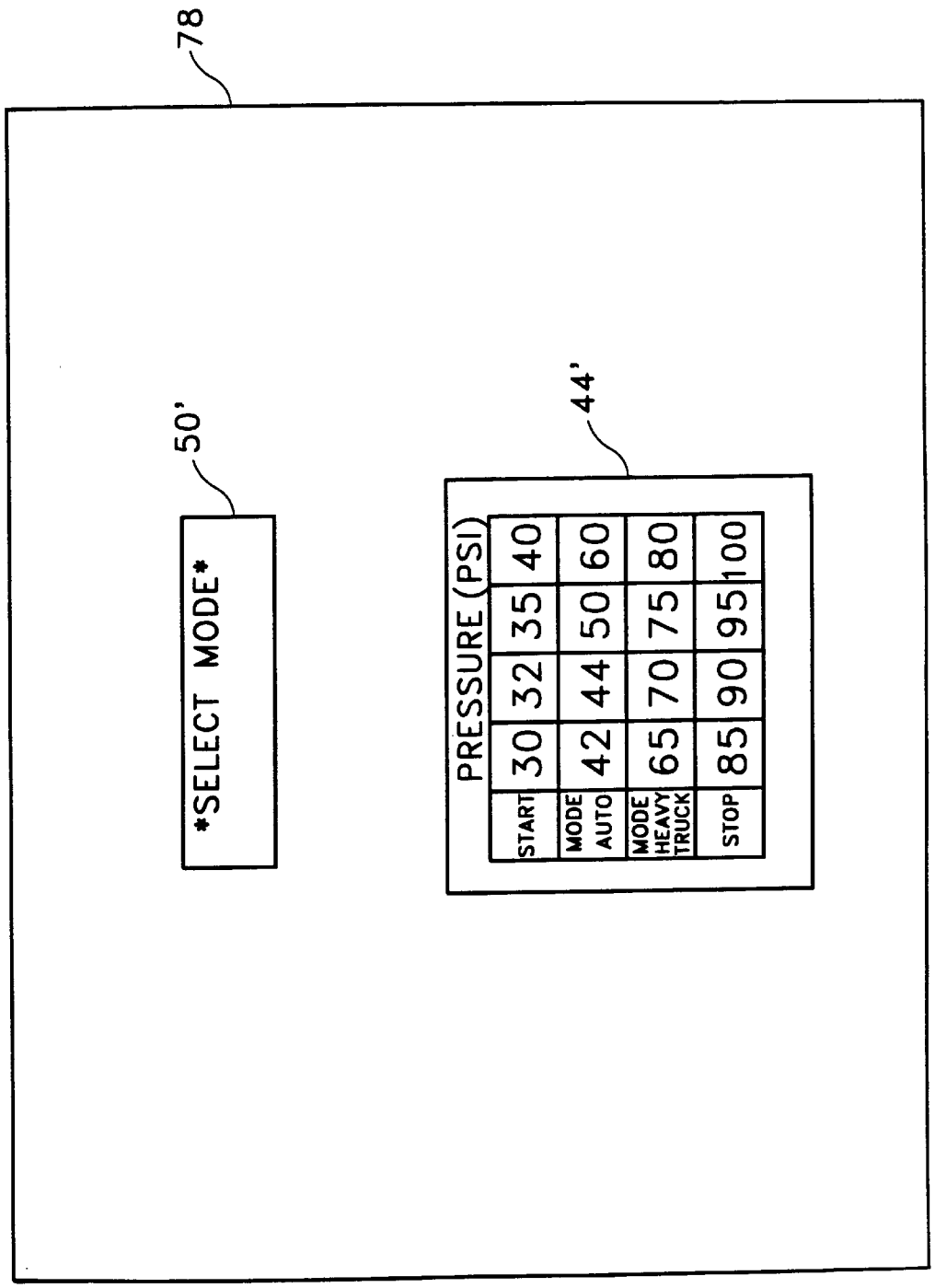
FIG. 2 is a plan view of the keyboard and display of FIG. 1.

With reference now to FIG. 2, a two dimensional drawing of the operator panel 78 for the preferred embodiment of the present invention is shown. The operator panel 78 contains keypad 44 and LCD 50 from FIG. 1 which will now be numbered with primes 44' and 50', respectively. The keyboard 44' provides keys labeled with particular tire pressure values for 28 to 90 psi, a STOP and START key, number of tires to inflate keys labeled 1 through 4, and two vehicle type keys bearing legends CAR and TRUCK. In an alternative embodiment (not shown) the keypad 44 includes buttons providing ranges of tire types (rim sizes or tire numbers) indicating volumes.

As will be described in greater detail below, during operation of the invention, LCD 50' displays "SELECT MODE" at the beginning of a pressure adjustment sequence. If the operator selects from the keypad 44' 'CAR' mode, then he or she has key choices in the pressure range of 28 to 50 psi. The computer 42 then prompts the operator by way of the LCD 50' to "ENTER NUMBER OF TIRES". If the operator selects a key other than the number 1 through 4 key, the computer 42 displays "WRONG KEY" on the LCD 50' and beeps the alarm 46 and then the sequence starts over from the beginning. The computer 42 then prompts the operator by way of the LCD 50' to "ENTER PRESSURE (28 to 50 PSI)". If the operator selects a pressure greater than 50 psi, the computer 42 displays "WRONG KEY" on the LCD 50' and beeps the alarm 46 and then the sequence starts over from the beginning. If the pressure key selected from the keypad 44' is within the range allowable for the particular 'MODE' selected, the computer 42 then displays to the LCD 50' "IS __PSI CORRECT (START/STOP)?", where the blank indicates the selected pressure. Then the operator can either stop or start the inflation/deflation sequence.

If the operator selects from the keypad 44' 'TRUCK' mode, then he or she has key choices in the pressure range of 28 to 90 psi. If the operator selects a key other than a pressure key, the computer 42 displays "WRONG KEY" on the LCD 50' and beeps the alarm 46 and then the sequence starts over from the beginning.

Pressurization Control Software

With reference now to FIGS. 3, 4, 5, and 6, a flowchart of a program executed by the computer 42 to control the operation of the system is shown.

A. Initialization

Figure 3:
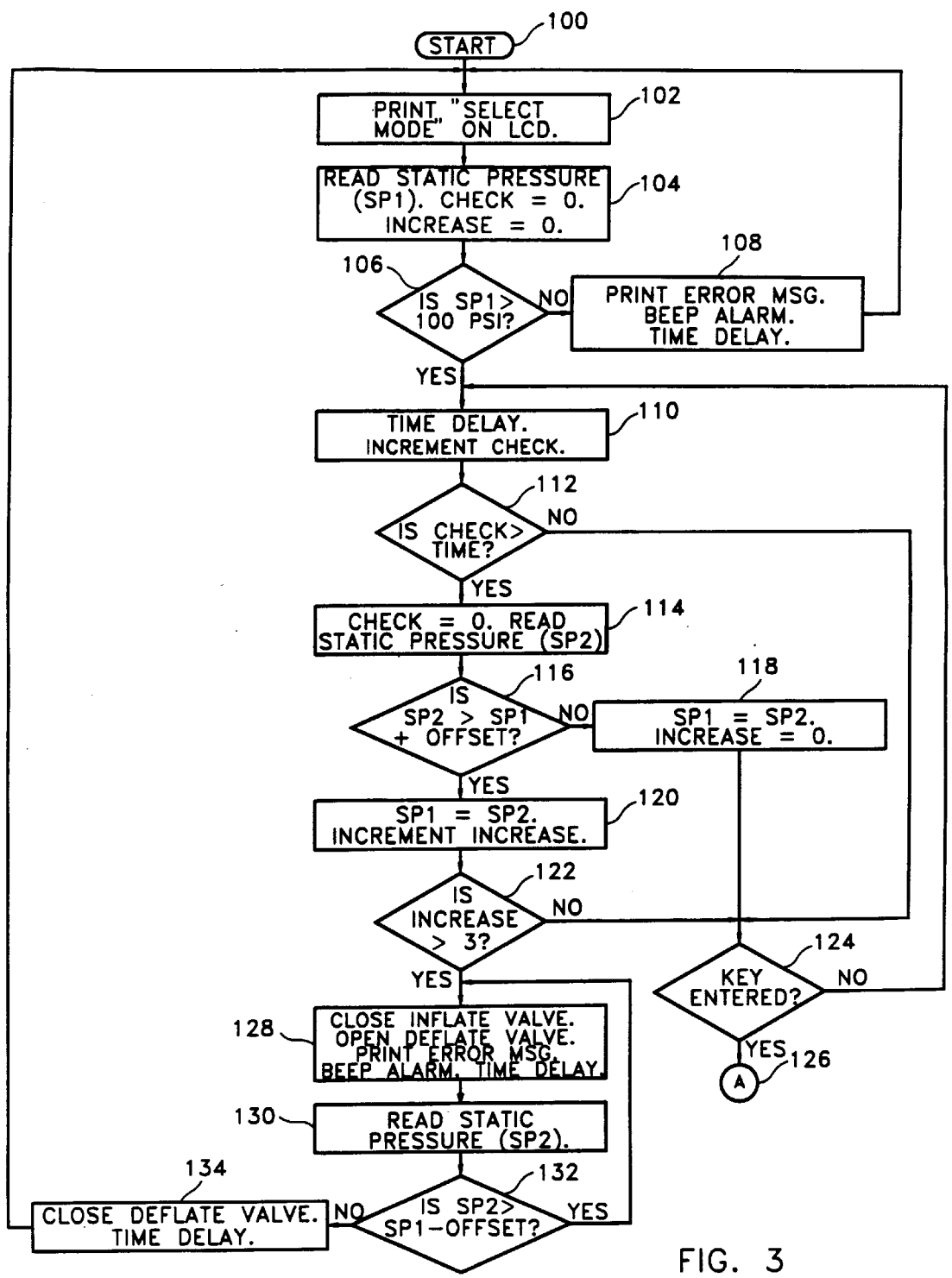
FIG. 3 is flow chart of a program executed by the computer of FIG. 1 during the initialization of the inflation system.

Referring specifically to FIG. 3, the system starts in an idle state and computer 42 is waiting for the MODE key to be entered on the keypad 44'. In this idle state, the only increase in pressure that should be detected is that of the locking tire chuck 26 being placed on a tire 30 and the air within the tire pressurizing the conduit 24. Otherwise, there should be no increases in pressure. Thus, the computer 42, while waiting for the MODE key, looks for successive increases in pressure.

Generally, if a certain number of increases are detected, i.e. a direct indication that the inflation valve 14 is shorted to an open state or 'sticking' due to possibly extreme environmental conditions, the computer 42 then opens the deflation valve 22, thus preventing the tire 30 from exploding. This method of opening the deflation valve 22 which is already incorporated into the system, and thus reducing the tire pressure, preventing it from increasing to the point of exploding, eliminates the need for a shutoff valve, pressure switch, and an elaborate logic circuit which would add cost and complexity to the system.

Specifically, the program begins at step 100 whenever the system is powered up or the system has completed an inflation/deflation cycle successfully and branches to step 102. At step 102, the computer 42 prints "SELECT MODE" to the LCD 50' and branches to step 104.

At step 104, the computer 42 reads the static pressure SP1 from the pressure transducer 34 and sets the variables CHECK and INCREASE equal to zero and then branches to step 106.

At step 106, the computer 42 checks the static pressure measured (SP1) with the highest pressure allowed in the system (100 psi). If the static pressure SP1 is greater than the highest pressure allowed, step 106 branches to step 108 and prints an error message to the LCD 50', beeps the alarm 46, implements a time delay, and then branches back to the beginning. This protects against the event that the pressure transducer 34 shorts out to power, or too high a pressure tire is being put on the system. If the pressure SP1 is less than or equal to the highest pressure allowed, step 106 branches to step 110.

At step 110, the computer 42 implements a time delay, increments the variable CHECK by one, and branches to step 112. At step 112, the computer 42 compares the variable CHECK to a TIME variable, and if CHECK is less than the TIME value, step 112 branches to step 124 which checks if a key was entered via the keypad 44'. If a key was entered at step 124, step 124 then branches to step 126 which continues in FIG. 4 as step 126'. If no key was entered, step 124 branches back to step 110 and the loop is repeated.

Conversely, if at step 112, and enough time has passed (five seconds), CHECK will be greater than the TIME value and step 112 will branch to step 114. At step 114, the computer 42 then resets the variable CHECK to zero, reads the static pressure SP2, and branches to step 116. If the latest pressure SP2 is less than the initial static pressure SP1 plus an offset, i.e. no increase in pressure was detected, step 116 branches to step 118 where the variable SP1 is set equal to SP2 and the variable INCREASE is set to zero. Step 118 then branches to step 124 which checks if a key was entered via the keypad 44'. If a key was entered at step 124, step 124 then branches to step 126 which continues in FIG. 4 as step 126'. If no key was entered, step 124 branches back to step 110 and the loop is repeated.

Conversely, if at step 116 the latest pressure SP2 is greater than the initial static pressure SP1 plus an offset, i.e. an increase in pressure was detected, step 116 branches to step 120 and sets SP1 equal to SP2, increments INCREASE by one, and branches to step 122.

Step 122 compares INCREASE with a number (three in the preferred embodiment). If INCREASE is less than three, step 122 then branches to step 124 which checks if a key was entered via the keypad 44'. If a key was entered at step 124, step 124 then branches to step 126 which continues in FIG. 4 as step 126'. If no key was entered, step 124 branches back to step 110 and the loop is repeated.

Conversely, if at step 122 INCREASE is greater than (three), i.e. the inflation valve 14 is stuck open, step 122 branches to step 128 and closes the inflation valve 14, opens the deflation valve 22, prints an error message to the LCD 50', beeps the alarm 46, and implements a time delay. Step 128 then branches to step 130 which reads the latest static pressure SP2 and branches to step 132. Step 132 compares the latest pressure SP2 with the earlier pressure reading SP1 minus an offset. If pressure SP2 is greater than pressure SP1 minus an offset, step 132 branches back to step 128 and this loop repeats. If at step 132, pressure SP2 is less than pressure SP1 minus an offset, step 132 branches to step 134 which closes the deflation valve 22, implements a time delay, and branches back to the beginning, thus requiring the pressure to fall to a safe level before control is regained.

B. Data Entry

Figure 4:
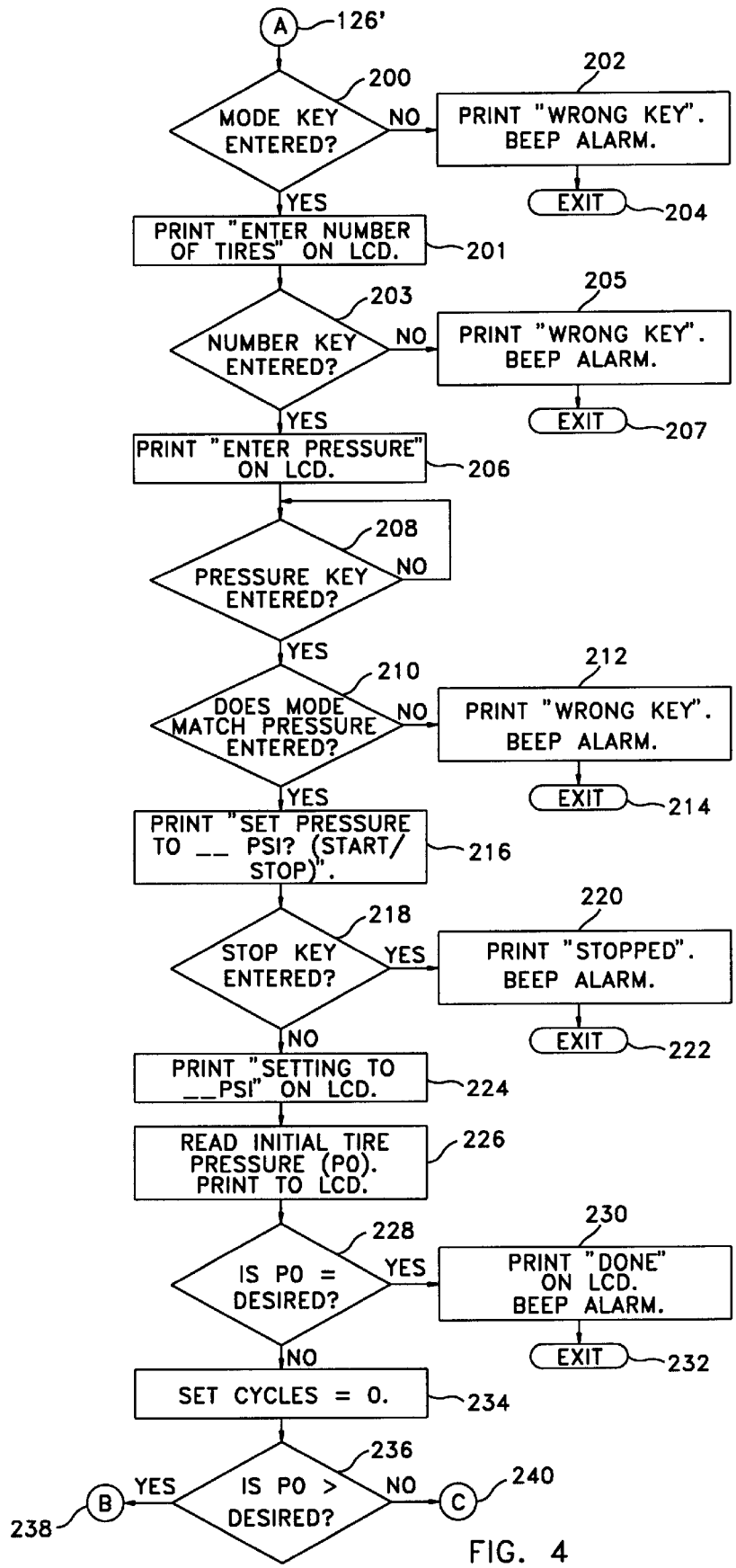
FIG. 4 is a figure similar to that of FIG. 3 showing a keyboard reading sequence for the inflation system.

With reference to FIG. 4 after step 126' (continued from FIG. 3, step 126), the program advances to step 200. At step 200, the computer 42 checks if a 'MODE' key was entered. If a key other than a 'MODE' key was entered, step 200 branches to step 202 and the computer 42 displays "WRONG KEY" on the LCD 50' and beeps the alarm 46. Step 202 then exits at step 204 back to the beginning at step 102. If a 'MODE' key was entered at step 200, step 200 then branches to step 201 and the computer 42 displays "ENTER NUMBER OF TIRES" on the LCD 50'. Step 201 then branches to step 203 wherein the computer 42 waits for a number of tire keys to be entered from the keypad 44'. While waiting for the number of tire keys to be entered, the computer 42 does the same background check as described in FIG. 3 to detect a short to an open state inflation valve 14. It is not shown here for reasons of clarity. Once a key is entered at step 203, step 203 branches to step 206. Step 206 displays "ENTER PRESSURE" on the LCD 50'. Step 206 then branches to step 208 wherein the computer 42 waits for a pressure key to be entered from the keypad 44'. Once a key is entered at step 208, step 208 branches to step 210.

At step 210, the computer 42 checks if the right pressure corresponding to the 'MODE' selected at step 200 was entered. If the pressure entered at step 208 was out of bounds based on the 'MODE' selected at step 200, step 210 branches to step 212 and displays on the LCD 50' "WRONG KEY" and beeps the alarm 46. Step 214 then exits back to the beginning at step 102. If the pressure entered at step 208 was in bounds based on the 'MODE' selected at step 200, step 210 branches to step 216.

At step 216 the computer 42 displays "SET PRESSURE TO __PSI? (START/STOP)" on the LCD 50' and branches to step 218. Here, again, the blank holds the entered pressure value.

At step 218, the computer 42 checks to see if the 'STOP' key was entered on keypad 44'. If the 'STOP' key was entered, then step 218 branches to step 220 and the computer 42 displays "STOPPED" on the LCD 50' and beeps the alarm 46. Step 220 branches to step 222 and exits back to the beginning at step 102. If the 'STOP' key was not entered, step 218 then branches to step 224.

At step 224, the computer 42 displays "SETTING TO __PSI" on the LCD 50' where the blank indicates the selected pressure. Step 224 then branches to step 226.

At step 226, the computer reads the initial tire pressure P0 from the pressure transducer 34 and displays it on LCD 50' and branches to step 228. Step 228 compares the actual tire pressure P0 with the desired pressure entered in step 208. If the actual pressure P0 is equal to the desired pressure, step 228 branches to step 230 and the computer 42 displays "DONE" on the LCD 50' and beeps the alarm 46. Step 230 then branches to step 232 which exits back to the beginning at step 102. If the tire pressure P0 does not equal the desired pressure entered in step 208, step 228 then branches to step 234.

At step 234, the computer 42 sets the variable CYCLES equal to zero. Step 234 then branches to step 236.

At step 236, the computer 42 compares the actual tire pressure P0 with the desired pressure entered in step 208. If the actual pressure P0 is greater than the desired pressure, step 236 branches to step 238 which continues in FIG. 5 as step 238'. Conversely, if the actual pressure P0 is less than the desired pressure, step 236 branches to step 240 which continues in FIG. 6 as step 240'.

C. Deflation Cycle

Figure 5:
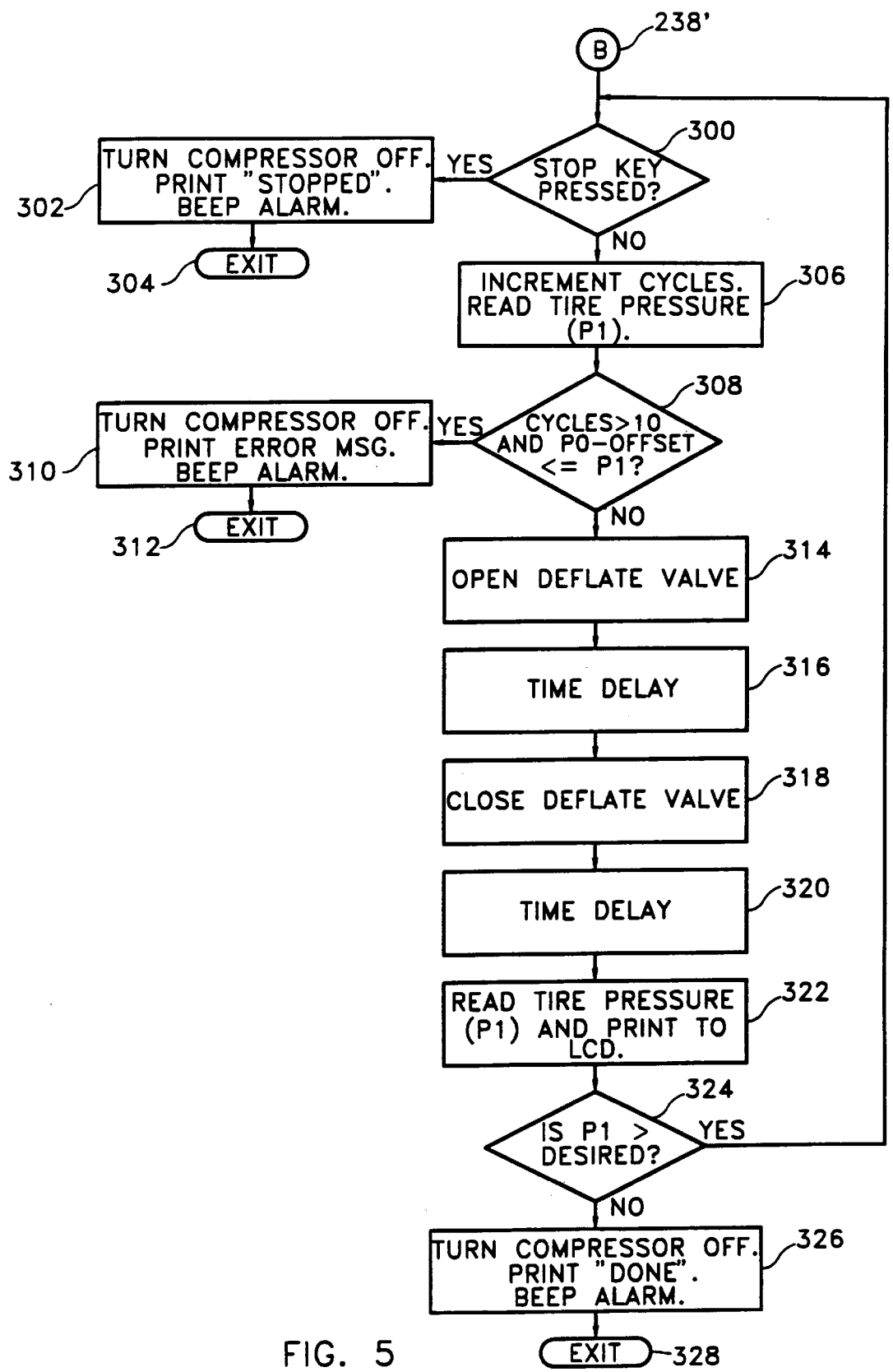
FIG. 5 is a figure similar to that of FIG. 3 showing a deflation sequence for the inflation system.

With reference to FIG. 5, the deflation cycle for the preferred embodiment of the present invention is shown. Step 238' branches to step 306.

At step 306, the computer 42 increments the variable CYCLES by one and reads the actual tire pressure P1 from pressure transducer 34. Step 306 then branches to step 308. Step 308 checks to see if the variable CYCLES is greater than (ten). If CYCLES is greater than (ten), the computer 42 then checks to see if the initial tire pressure P0 from step 226 minus an offset is less than or equal to the latest tire pressure P1, i.e. has there been a change in pressure. If true, (no change in pressure) step 308 branches to step 310 and the computer 42 displays an error message on the LCD 50', and beeps the alarm 46. Step 310 then branches to step 312 which exits back to the beginning at step 102. If step 308 is false, step 308 branches to step 314. This logic protects the tire 30 from going flat if the pressure transducer 34 was shorted to power. The transducer 34 being shorted to power during the deflation cycle would cause the computer 42 to read a high pressure that would never change, thus, the computer 42 would open the deflation valve 22 indefinitely causing the tire 30 to go flat. Therefore, by having the computer 42 check for inactivity in decreasing pressure, the computer 42 can detect the shorted transducer and shut the system down.

At step 314, the computer 42 opens the deflation valve 22 via the solid state relay 56, thus reducing the tire pressure, and then branches to step 316. Step 316 implements a calculated time delay and branches to step 318. This calculated time delay is based on the type and number of tires entered previously (providing an effective total tire volume) and on a percentage of the tire pressure desired versus the actual tire pressure. The percentage which is respective of the tire pressure remaining to be deflated is converted to a time delay interval for taking samples of the tire pressure. The first time delay interval is longer if the desired pressure is farther away from the actual pressure. As the tire pressure falls, the time delay intervals get closer and closer until the desired pressure is obtained. The formula for the deflate time delay is as follows: time delay=((reading P1*100)/setting) −100)*time constant. The time constant is a number related to the type and number of tires entered. The number is larger for larger tires as may be deduced from type of vehicle: car or truck or from a keying in of the tire type number, the latter which may used to access a small database of stored tire types providing a volume equivalency. The tire type number may be any number that indicates the tire volume including rim size, tire number (on the sidewall), catalog number or actual tire volume. The number is also larger if the number of tires to deflate is larger. Thus, this calculated time delay is volume sensitive to the required air volume of the tires at hand.

At step 318, the computer 42 closes the deflation valve 22 via the solid state relay 56 and branches to step 320. At step 320, the computer implements a time delay and branches to step 322. At step 322, the computer 42 reads the tire 30 pressure P1 from the transducer 34 and displays this pressure on the LCD 50'. These special delays in the deflation cycle allow the air pressure to stabilize in the air conduit before a pressure reading is taken thus enabling an accurate reading without having to add the cost of a needle valve or an orifice.

At step 324, the computer 42 compares the actual tire pressure P1 with the desired pressure. If the actual tire pressure P1 is still greater than the desired pressure, step 324 branches back to step 300 wherein the loop continues until the tire pressure P1 is adjusted to the desired pressure. At that point in time, step 324 branches to step 326 wherein a message "DONE" is printed to the LCD 50', and the alarm 46 beeps. Step 326 then branches to step 328 which exits back to the beginning of the program at step 102.

D. Inflation Cycle

Figure 6:
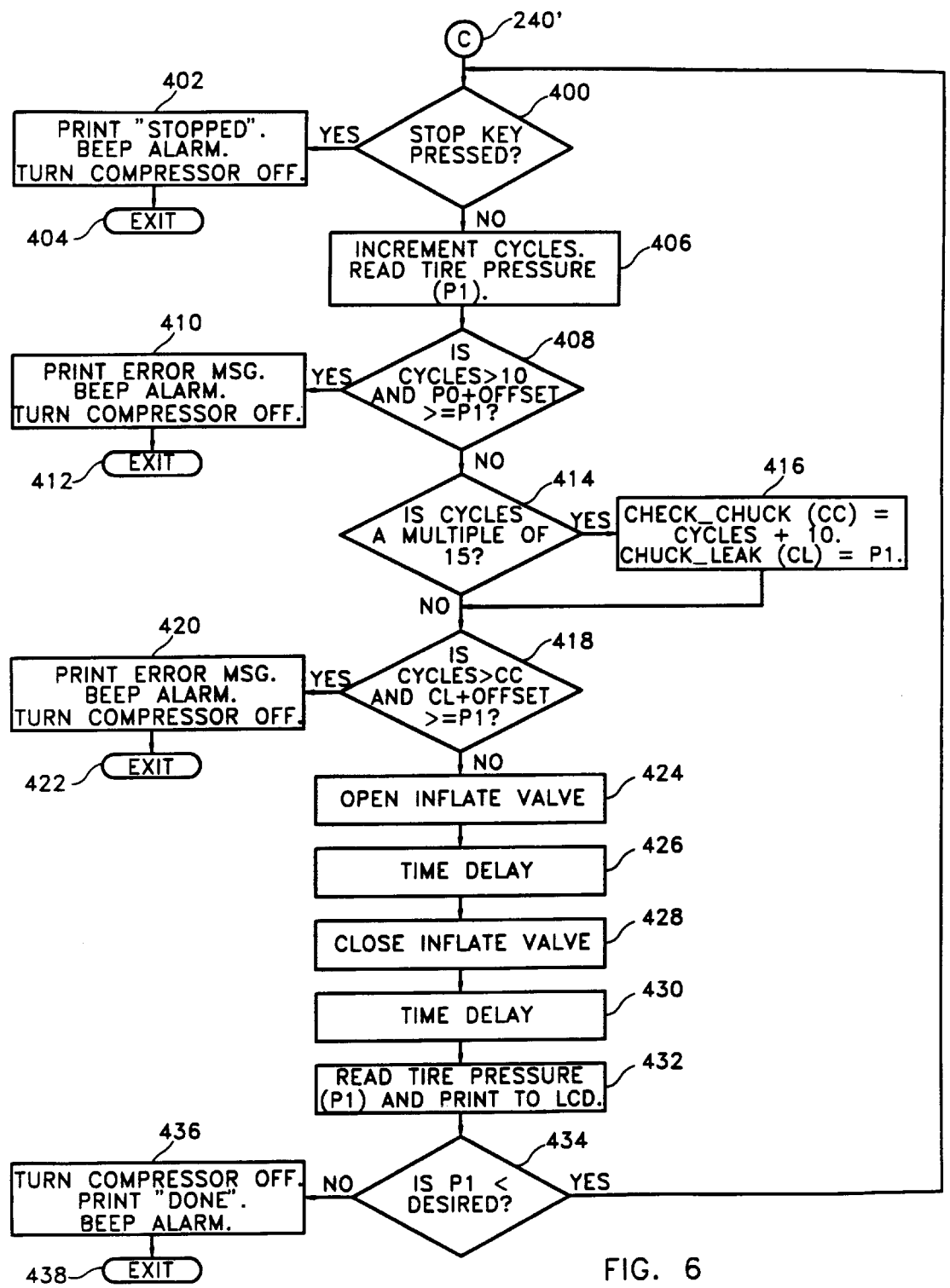
FIG. 6 is a figure similar to that of FIG. 3 showing an inflation sequence for the inflation system.

With reference to FIG. 6, the inflation cycle for the preferred embodiment of the present invention is shown. Continued from FIG. 4, step 240, step 240' branches to step 400. At step 400, the computer 42 turns the compressor 10 on via solid state relay 58. Step 400 then branches to step 406.

At step 406, the computer 42 increments the variable CYCLES by one and reads the actual tire pressure P1from pressure transducer 34. Step 406 then branches to step 408. Step 408 checks to see if the variable CYCLES is greater than (ten). If CYCLES is greater than ten, the computer 42 then checks to see if the initial tire pressure P0 from step 226 plus an offset is greater than or equal to pressure P1. If true, i.e. there has been no change in pressure, step 408 branches to step 410 and the computer 42 turns the air compressor 10 off, displays an error message on the LCD 50', and beeps the alarm 46. Step 410 then branches to step 412 which exits back to the beginning at step 102. If step 408 is false, step 408 branches to step 414. This logic protects the tire 30 from exploding if the pressure transducer 34 was shorted to ground. The transducer 34 being shorted to ground during the inflation cycle would cause the computer 42 to read zero pressure, thus opening the inflation valve 14 indefinitely. Thus, if there is inactivity in increasing pressure during an inflate cycle, i.e. the pressure is not going up, the computer will detect this and shut the system down. This can also be an indication that the compressor didn't turn on or the tire has a hole in it so big that it can't be inflated.

Step 414 checks to see if the variable CYCLES is a multiple of (fifteen). If so, step 414 branches to step 416 which sets a variable CHUCK_CHECK (CC) equal to CYCLES plus (ten) and sets a variable CHUCK_LEAK (CL) equal to the tire pressure P1. Step 416 then branches to step 418. If at step 414, CYCLES is not a multiple of fifteen, step 414 branches to step 418. At step 418, the computer 42 checks to see if CYCLES is greater than CC. If CYCLES is greater than CC, then the computer 42 checks to see if CL plus an offset is greater than or equal to P1. If true, step 418 branches to step 420 and the computer 42 turns the compressor 10 off, displays an error message on the LCD 50', and beeps the alarm 46. Step 420 then branches to step 422 which exits back to the beginning at step 102. If step 418 is false, step 418 branches to step 424. This logic protects against having a leaking, locking tire chuck 26, air conduit 24, or other leak in the system and thus prevents an infinite inflate cycle. This method checks and updates the increasing pressure periodically. Thus, when inflating tires, and the tire chuck becomes loose after inflating for a while (i.e. the same amount or less air is going into the tire as is coming out of the tire), the system will prevent itself from inflating forever.

At step 424, the computer 42 opens the inflation valve 14 via the solid state relay 54, thus increasing the tire pressure, and then branches to step 426. Step 426 implements a calculated time delay and branches to step 428. This calculated time delay is based on the type and number of tires entered previously and on the changing percentage of the tire pressure desired verses the actual tire pressure. The percentage of pressure remaining to be inflated is converted to a time delay interval for taking samples of the tire pressure. The first time delay interval is longer if the desired pressure is farther away from the actual pressure. As the tire pressure rises, the time delay intervals get closer and closer until the desired pressure is obtained. The formula for the inflate time delay is as follows: time delay=(100−((reading P1*100)/setting))*time constant. The time constant is a number related to the type and number of tires entered. The number is larger for larger tires. The number is also larger if the number of tires to inflate is larger. Thus, this calculated time delay is sensitive to the air volume of the tires at hand.

The total tire volume may alternatively be deduced in the initial inflation cycle as follows: first the tire pressure is checked and recorded. Second the tire is inflated for a predetermined period of time. The tire pressure is then checked and recorded. If the original pressure is below a predetermined limit (indicating a tire that is not even partially inflated), this inflation cycle is repeated. Otherwise the difference between the original tire pressure and the final tire pressure after the predetermined period of time is used to deduce a rate of inflation which for a given and fixed air source pressure provides an indication of total tire volume. That is, larger tire volumes will experience a slower inflation rate.

At step 428, the computer 42 closes the inflation valve 14 via the solid state relay 54 and branches to step 430. At step 430, the computer 42 implements a time delay and branches to step 432. At step 432, the computer 42 reads the tire pressure P1 from the transducer 34 and displays this pressure on the LCD 50'. These special delays in the inflation cycle allow the air pressure to stabilize in the air conduit before a pressure reading is taken, thus increasing accuracy without having to add the cost of a needle valve or an orifice.

At step 434, the computer 42 compares the actual tire pressure P1 with the desired pressure. If the actual pressure P1 is still less than the desired pressure, step 434 branches back to step 400 wherein the loop continues until the tire pressure P1 is adjusted to the desired pressure. At that point in time, step 434 branches to 436 wherein the compressor 10 is turned off, a message "DONE" is printed to the LCD 50', and the alarm 46 beeps. Step 436 then branches to step 438 which exits back to the beginning of the program at step 102.

Having described my invention, however, many modifications thereto will become apparent to those skilled in the art to which it pertains without deviation from the spirit of the invention as defined by the scope of the claims.

I claim:

1. A controller for pressurizing pneumatic tires of a vehicle from a source of pressurized air comprising:

an air flow valve connected to the source of pressurized air to permit the flow of air from the source into the pneumatic tire when in an open state and to prevent the flow of air from the source into the pneumatic tire when in a closed state;

a data entry terminal permitting the entry of a desired inflation pressure for the pneumatic tire and a vehicle type for the vehicle; and an electronic computer receiving data from the data entry terminal, connected to the air flow valve, and operating according to a stored program to:
a) read the desired inflation pressure and the vehicle type from the data entry terminal;
b) compare the desired inflation pressure with a stored range of inflation pressures for the vehicle type; and
c) opening the air flow valve to inflate a connected pneumatic tire to the desired inflation pressure only if the desired inflation pressure is within the stored range of inflation pressure.

2. The controller of claim 1 wherein the data entry device is a keyboard and provides individual keys for a limited number of predetermined desired inflation pressures; wherein only a limited number of predetermined desired inflation pressures may be entered.

3. The controller of claim 1 wherein the data entry device is a keyboard and provides individual keys for a limited number of predetermined vehicle types including passenger automobile and heavy truck.

4. The controller as recited in claim 1 including also, a pressure transducer communicating with the electronic computer to provide a tire pressure of the pneumatic tire;

a display communicating with the electronic computer;

wherein the computer operating according to the stored program also displays the desired pressure and the tire pressure.

5. The controller as recited in claim 1 including also, a pressure transducer communicating with the electronic computer to provide a tire pressure of the pneumatic tire;

a display communicating with the electronic computer;

wherein the computer operating according to the stored program also displays an error message if the desired inflation pressure is not within the stored range of inflation pressure.

6. A controller for pressurizing pneumatic tires for vehicles from a source of pressurized air comprising:

an air flow valve connected at one end of an elongate hose extending to the pneumatic tire, the valve permitting the flow of air between the valve and the pneumatic tire through the hose, when in at least one open state and preventing the flow of air between the valve and the pneumatic tire through the hose when in a closed state;

a data entry terminal permitting the entry of a desired inflation pressure for the pneumatic tire;

tire volume input device providing an indication of the total tire volume to be inflated;

a pressure transducer attached to the hose between the valve and the tire, the transducer providing a reading of a hose pressure of air within the hose; and an electronic computer receiving data from the data entry terminal, the tire volume input device and the pressure transducer, connected to the air flow valve, and operating according to a stored program to:
 a) select a sampling interval based on total tire volume;
 b) close the air valve for a predetermined settling time interval sufficient so as to equalize a pressure between the tire and the hose;
 c) read a hose pressure after the predetermined settling time interval; and
 d) if the desired inflation pressure differs from the hose pressure, open the air flow valve for the sampling interval and repeat steps (a) through (c).

7. The controller of claim 6 wherein the tire volume input device is a data entry terminal providing for the entry of total number of tires.

8. The controller of claim 7 wherein data entry terminal is a keyboard with preprinted keys.

9. The controller of claim 8 wherein the keyboard provides keys indicating car and truck tires.

10. The controller of claim 6 wherein the keyboard provides for the entry of tire type numbers from the group consisting of rim size, tire number, catalog number or tire volume.

11. The controller of claim 6 wherein the tire volume input device is the stored program operating the electronic computer to analyze the rate of inflation for a first inflation period to deduce total tire volume.

12. The controller of claim 6 wherein the electronic computer operates to select the sampling interval based on the difference between the hose pressure and the desired inflation pressure.

* * * * *